I. BAUER.
PERCOLATOR.
APPLICATION FILED JUNE 25, 1915.
1,175,682.
Patented Mar. 14, 1916.
2 SHEETS—SHEET 1.
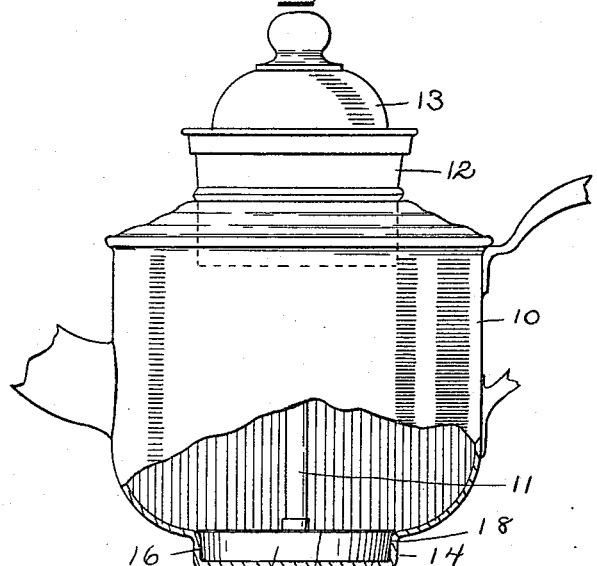
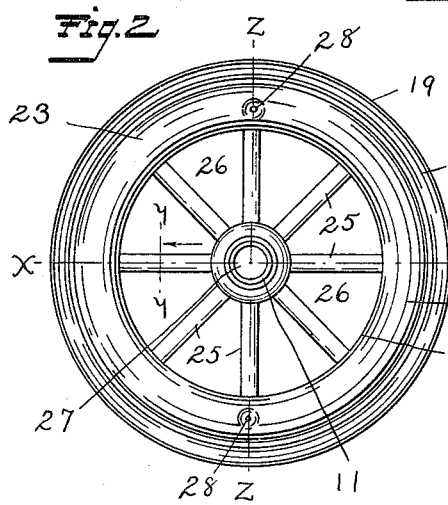
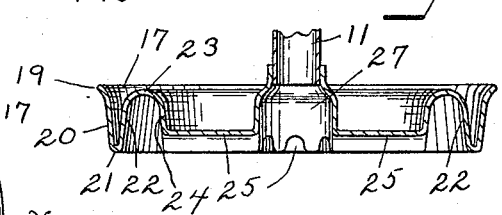
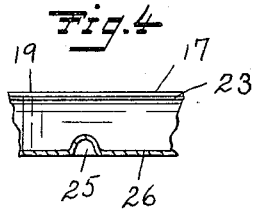
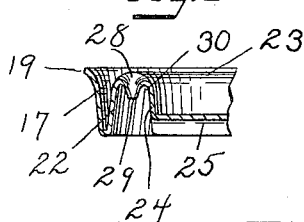
Witnesses:
R. W. Edwards.
D. R. Edwards.
Inventor:
Isaac Bauer.
By Louis M. Schmidt
Atty.

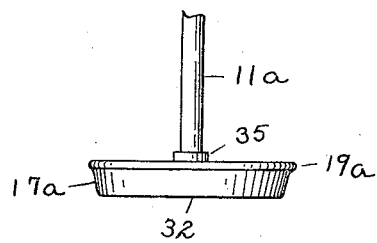
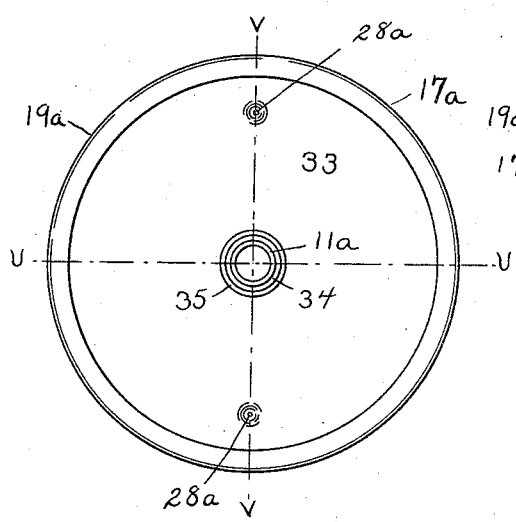
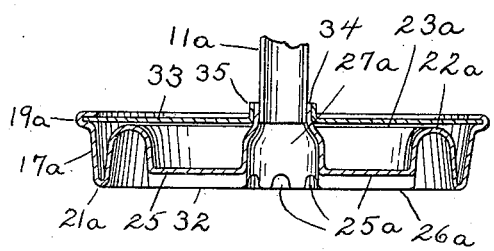
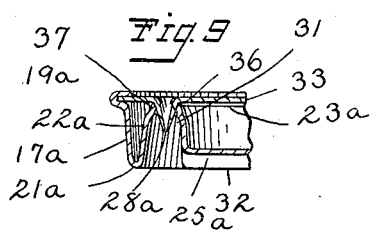

UNITED STATES PATENT OFFICE.

ISAAC BAUER, OF MIDDLETOWN, CONNECTICUT, ASSIGNOR TO THE NEW ENGLAND ENAMELING COMPANY, OF MIDDLETOWN, CONNECTICUT, A CORPORATION.

PERCOLATOR.

1,175,682.   Specification of Letters Patent.   Patented Mar. 14, 1916.

Application filed June 25, 1915.   Serial No. 36,192.

*To all whom it may concern:*

Be it known that I, ISAAC BAUER, a citizen of the United States, residing at Middletown, in the county of Middlesex and State of Connecticut, have invented certain new and useful Improvements in Percolators, of which the following is a specification.

My invention relates to improvements in percolators, and the object of my improvement is simplicity and economy in construction and convenience and efficiency in use.

In the accompanying drawing:—Figure 1 is a side elevation, in part broken away, of a percolator embodying my invention. Fig. 2 is a plan view, on an enlarged scale, of the tube member shown in Fig. 1. Fig. 3 is a sectional view on the line $x$ $x$ of Fig. 2. Fig. 4 is a sectional view on the line $y$ $y$ of Fig. 2. Fig. 5 is a sectional view on the line $z$ $z$ of Fig. 2. Fig. 6 is a side elevation, on the same scale as Fig. 1, of a modified form of the tube member. Fig. 7 is a plan view on an enlarged scale, of the same. Fig. 8 is a sectional view on the line $u$ $u$ of Fig. 7. Fig. 9 is a sectional view on the line $v$ $v$ of Fig. 7.

My improved percolator comprises a percolator body 10, in which is housed a tube member having a tube 11 and provided at the upper portion with a basket member 12, that sets in the opening in the top of the percolator body 10 and incloses the upper end of the tube 11, the top of the basket member 12 being closed by the cover 13. The basket member 12 and cover 13 are ordinary. The percolator body 10 is also ordinary and comprises at the lower end a circular foot 14 which in the interior is in the form of a well 18 having a generally flat bottom 15 and a cylindrical side wall 16.

The tube member comprises the tube 11 extending along the axis of the body 10, opening at the upper end in the basket 12 in the usual manner, and at the lower end is provided with a generally circular extension 17 fitting in the well 18, and of special construction. The said extension 17 comprises a laterally directed lip 19 at the top edge of the periphery that is a fit for the top edge portion of the well 18, at the junction of the cylindrical side wall 16 and the adjacent portion of the body 10, and below the said lip the lateral wall 20 drops converging or conical slightly suitably to provide a circular foot 21 resting on the bottom 15 of the well 18.

The circular foot 21 is formed by a return bend of the material of the extension 17. On the inner side of the foot 21 is a relatively large, circular corrugation 22, the roof portion 23 of which is rounded and is approximately at the same height as the lip 19. The inner wall 24 of the corrugation 22 extends down to the level of the foot 21 generally, except that at a plurality of points there are ducts 25 leading from the interior of the corrugation 22 to the opening in the tube 11. As shown there are eight ducts 25. Fanlike or sector shaped webs 26 fill in the spaces between the inner edges of the inner walls 24 of the circular corrugations 22, the opposed edges of the corrugations 22 forming the radial ducts or channels 25, and the base of the tube 11.

At the junction 27 of the ducts 25 and the tube 11 there is a relatively large open space, suitable for housing an appreciable quantity of liquid, and which because of the location at the middle of the structure formed by the combination of the tube 11 and extension 17 is most favorably situated for receiving heat transmitted through the base 15, and under normal operating conditions is at the highest temperature of any of the parts. Therefore ebullition takes place in the said space 27 and the same serves as the heating chamber.

The large circular corrugation 22 serves as a reservoir or liquid receiving chamber, in which during operation an appreciable quantity of liquid is temporarily housed, separated from the liquid in the percolator body 10 by the material of the extension 17, and while so separated or confined is subjected to a preliminary heating by heat transmitted through the bottom or base 15. As ebullition takes place in the liquid heating chamber 27 and liquid is thrown upwardly and discharged through the tube 11 a fresh supply of liquid to take the place of that discharged is supplied from the liquid receiving chamber 22 by way of the ducts 25.

In order to admit fresh liquid from the percolator body 10 to the liquid receiving chamber 22 to displace that supplied to the liquid heating chamber 27 one or more relatively restricted passage ways 28 are provided. Such passage ways may be provided in any suitable manner, and may in some cases consist simply of a small perforation or pin hole. I find it convenient to provide such passage ways 28 at the apex portion 23 of the corrugation forming the liquid receiving chamber 22. I form the same like diminutive tapered nozzles, extending downwardly from the roof or apex portion 23 an appreciable distance into the space inclosed by the said corrugation, so that the mouth 29 of the nozzle 28 is positioned appreciably below the internal portion of the roof 23 or the roof proper. Accordingly, when liquid is discharged from the heating chamber 27 through the tube 11, heated liquid will flow from the liquid receiving chamber 22 to replace the same and a fresh charge will enter the liquid receiving chamber by way of the passage ways 28.

By reason of the special character of the passage ways 28 and the connected parts as described these functionate in a special and peculiar manner so as to favor the flow of liquid in one direction, from the body 10 to the liquid receiving chamber 22 and to tend to restrict such flow on the reverse direction. The tapered nozzle form of the passage ways 28, with the smaller end 29 serving as a delivery outlet at the lower or liquid receiving chamber end assists in effecting this result.

Another important feature is the depressed feature of the outlet or delivery mouth 29 below the roof 23 of the liquid receiving chamber 22. The proper operation of this feature begins after the ebullition stage has been reached and some vapor has collected in the space 30 above the mouth 29 of the passage way, and between the said mouth and the roof 23. Thus an appreciable quantity of vapor will be pocketed in the space 30, so that the said space will serve as a pneumatic chamber when the ebullition reaches the stage when liquid is forced out of the liquid heating chamber 27 and up the tube 11, that is to say, when the percolating stage has been reached. It is understood that the when such percolating stage is reached, so that liquid is forced from the heating chamber 27, the tendency is to force liquid from the said chamber 27 in all directions. As the connections to the said chamber 27 include the ducts 25 as well as the tube 11 there will be a tendency to force liquid backwardly or outwardly through the said ducts 25 as well as up the tube 11. In some cases or constructions special means are provided, generally involving the use of a valve structure to prevent such return flow. By the construction shown and described the operation is such that a limited return flow is permitted along the ducts 25, escape of the liquid is prevented other than to an inappreciable extent by making the size of the mouth 29 quite small, and the major part of the liquid returned is housed in the liquid receiving chamber 22 by forcing surplus liquid above the mouth 29, into the pneumatic chamber 30. After relief has been effected by the delivery of liquid from the top of the tube 11 this excess liquid is forced from the pneumatic chamber 30 into the liquid heating chamber 22 by the vapor pocketed on the pneumatic chamber 30, and fresh liquid will flow into the liquid receiving chamber through the passage ways 28, so that conditions are again established suitable for percolating again.

In the modification shown in Figs. 6, 7, 8 and 9 the extension 17$^a$ is a double walled structure composed of a lower plate 32 and an upper plate 33, separated by an air space 31. The lower plate 32 comprises the foot 21$^a$, large circular corrugation 22$^a$, ducts 25$^a$, heating chamber 27$^a$, and fanlike webs 26$^a$ as in the style shown in Fig. 3 generally as already described. The lip 19$^a$ at the periphery is incorporated in the joint that serves to connect the lower plate 32 with the upper plate, 33, which joint may consist as shown of a turned edge on one plate inclosing the free edge of the other plate. The upper plate 33 is of disk-like form, connected at the periphery with the lower plate 32 in the manner described and connected at the middle either directly to the tube 11$^a$ or by means of a neck 35 to a neck 34 on the lower plate, at the upper end of the heating chamber 27$^a$, which neck 34 is connected to the tube 11$^a$. The passage ways 28$^a$ are provided in the upper plate 33, the material being forced downwardly through holes 36 in the roof portion 23$^a$ of the large corrugation 22$^a$. A boss 37 may be thrown up as shown from the said roof portion 23$^a$ to meet the upper plate 33, the hole 36 being positioned in the said boss 37. Air would be housed in the space 31 which would serve as a protecting layer or wall to protect the liquid under the lower plate 32 from the cooling effect of the relatively cooler liquid in the body 10 of the percolator.

I claim as my invention:—

1. In a percolator having a body provided with a well in the base portion, a tube member having an extension fitting in the said well, the said extension having a corrugation forming the upper wall portion of a liquid heating chamber, and the said wall portion being provided with a tapered nozzle-like passage way of appreciable length interconnecting the said percolator body and heating chamber.

2. In a percolator, a body having a well in the base portion, a tube member having a tube, and an extension at the lower end of the said tube fitting in the said well, the said extension having a relatively large circular corrugation forming a liquid receiving chamber, a set of ducts connecting the said liquid receiving chamber and the said lower end of the tube, and the said corrugation being provided with a passage way connecting the said body and the liquid receiving chamber having the outlet appreciably below the roof portion of the said liquid receiving chamber.

3. In a percolator, a tube member comprising a tube at the middle portion and an extension at the lower end of the said tube, the said extension comprising a double walled structure, composed of an upper and a lower plate connected to form an air chamber, the said lower plate comprising a corrugation adjacent the periphery and a set of ducts connecting the said corrugation with the said tube, and the said plates being provided with a passage way extending through the said upper plate and opening into the said corrugation.

ISAAC BAUER.

Witnesses:
  FRED H. CARPENTER,
  THOMAS H. CONROY.

Copies of this patent may be obtained for five cents each, by addressing the "Commissioner of Patents, Washington, D. C."